US010484126B2

(12) United States Patent
Harrison et al.

(10) Patent No.: US 10,484,126 B2
(45) Date of Patent: Nov. 19, 2019

(54) CSI REPORT FOR MTC OPERATION

(71) Applicant: Telefonaktiebolaget LM Ericsson (publ), Stockholm (SE)

(72) Inventors: Robert Mark Harrison, Grapevine, TX (US); Yufei Blankenship, Kildeer, IL (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 15/317,336

(22) PCT Filed: Nov. 4, 2016

(86) PCT No.: PCT/SE2016/051091
§ 371 (c)(1),
(2) Date: Dec. 8, 2016

(87) PCT Pub. No.: WO2017/078608
PCT Pub. Date: May 11, 2017

(65) Prior Publication Data
US 2017/0289825 A1   Oct. 5, 2017

Related U.S. Application Data

(60) Provisional application No. 62/252,233, filed on Nov. 6, 2015.

(51) Int. Cl.
*H04L 1/00* (2006.01)
*H04L 5/00* (2006.01)

(52) U.S. Cl.
CPC .......... *H04L 1/0026* (2013.01); *H04L 5/0057* (2013.01); *H04L 1/0029* (2013.01); *H04L 1/0031* (2013.01)

(58) Field of Classification Search
CPC ..... H04W 24/08; H04W 24/10; H04W 88/08; H04W 88/02; H04W 24/02
See application file for complete search history.

(56) References Cited

U.S. PATENT DOCUMENTS

2012/0009959 A1\* 1/2012 Yamada ............... H04B 7/0413
455/507
2013/0064119 A1\* 3/2013 Montojo ........... H04W 36/0061
370/252
(Continued)

FOREIGN PATENT DOCUMENTS

WO   2015/012653   1/2015
WO   2015/062557   5/2015

OTHER PUBLICATIONS

PCT, Notification of Transmittal of the International Search Report and the Written Opinion of the International Searching Authority, or the Declaration; International Application No. PCT/SE2016/051091, Reference No. P48582WO1, dated Jan. 31, 2017.
(Continued)

Primary Examiner — Atique Ahmed
(74) Attorney, Agent, or Firm — Baker Botts, LLP

(57) ABSTRACT

According to some embodiments, a method of reporting a channel quality indicator (CQI) comprises receiving, in a wireless network comprising a carrier bandwidth of a first number of physical resource blocks (PRBs), a physical channel comprising a first PRB set with a bandwidth of a second number of PRBs. The second number of PRBs is less than the first number of PRBs. The method further comprises determining a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is
(Continued)

transmitted in the subframe. The method further comprises transmitting a report to a network node. The report comprises the determined CQI.

32 Claims, 11 Drawing Sheets

(56) References Cited

U.S. PATENT DOCUMENTS

| | | | | |
|---|---|---|---|---|
| 2014/0328304 | A1* | 11/2014 | Suzuki | H04L 5/001 370/329 |
| 2015/0181576 | A1* | 6/2015 | Papasakellariou | H04L 5/0053 370/329 |
| 2015/0256403 | A1* | 9/2015 | Li | H04W 4/70 370/235 |
| 2015/0280888 | A1* | 10/2015 | Karsi | H04L 5/0073 370/329 |
| 2016/0127936 | A1* | 5/2016 | Chatterjee | H04B 7/0626 370/252 |
| 2016/0182208 | A1* | 6/2016 | Yi | H04L 1/0026 370/329 |
| 2016/0323901 | A1* | 11/2016 | Yum | H04W 72/085 |
| 2017/0041112 | A1* | 2/2017 | Kim | H04W 76/023 |
| 2017/0118747 | A1* | 4/2017 | Rico Alvarino | H04W 72/0413 |
| 2017/0164350 | A1* | 6/2017 | Sun | H04L 5/0007 |

OTHER PUBLICATIONS

PCT, International Search Report, International Application No. PCT/SE2016/051091, Reference No. P48582WO1, dated Nov. 4, 2016.
PCT, Written Opinion of the International Searching Authority (PCT Rule 43bis. 1); International Application No. PCT/SE2016/051091, Reference No. PCT/ISA/220, dated Nov. 4, 2016.
3GPP TS 36.211 V12.7.0 (Sep. 2015), Technical Specification, 3rd Generation Partnership Project; Technical Specification Group Radio Access Network; Evolved Universal Terrestrial Radio Access (E-UTRA); Physical channels and modulation (Release 12); Advanced LTE, 3GPP™, © 2015, 3GPP Organizational Partners (ARIB, ATIS, CCSA, ETSI, TSDSI, TTA, TTC), http://www.3gpp.org; 136 pages.
3GPP TS 36.213 V12.7.0 (Sep. 2015), Technical Specification, 3rd Generation Partnership Project; Technical Specification Group Radio Access Network; Evolved Universal Terrestrial Radio Access (E-UTRA); Physical layer procedures (Release 12); Advanced LTE, 3GPP™, © 2015, 3GPP Organizational Partners (ARIB, ATIS, CCSA, ETSI, TSDSI, TTA, TTC); http://www.3gpp.org; 241 pages.
3GPP TS 36.331 V12.7.0 (Sep. 2015), Technical Specification, 3rd Generation Partnership Project; Technical Specification Group Radio Access Network; Evolved Universal Terrestrial Radio Access (E-UTRA); Radio Resource Control (RRC); Protocol specification (Release 12); Advanced LTE, 3GPP™, © 2015, 3GPP Organizational Partners (ARIB, ATIS, CCSA, ETSI, TSDSI, TTA, TTC); http://www.3gpp.org; 453 pages.

* cited by examiner

800

812 - transmit, in a wireless network comprising a carrier bandwidth of a first number of PRBs, a physical channel comprising a first PRB set with a bandwidth of a second number of PRBs

814 - receive, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe

Fig. 8

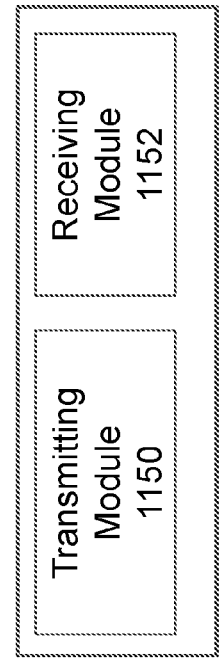
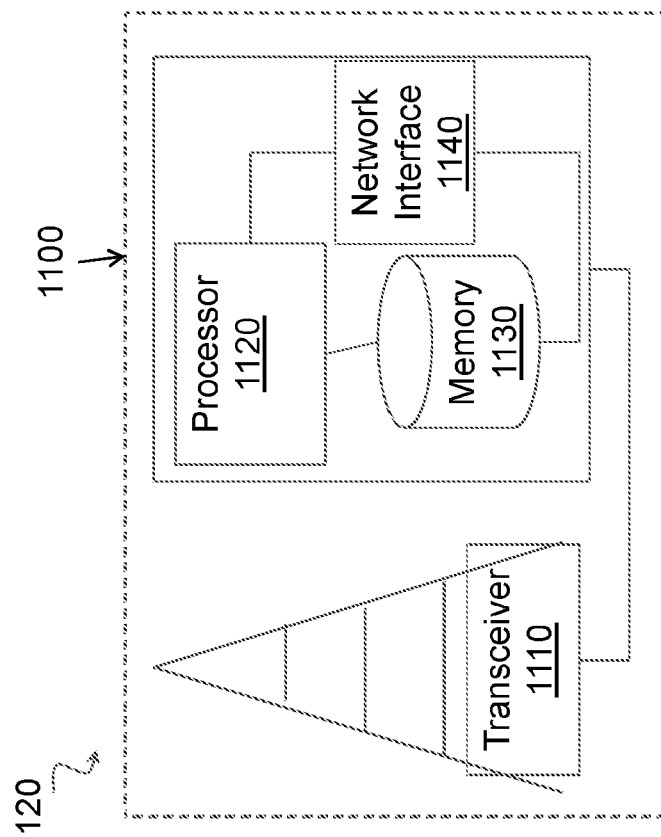
Fig. 11B
Fig. 11A

CSI REPORT FOR MTC OPERATION

PRIORITY

This nonprovisional application is a U.S. National Stage Filing under 35 U.S.C. § 371 of International Patent Application Serial No. PCT/SE2016/051091 filed Nov. 4, 2016, and entitled "CSI Report For MTC Operation" which claims priority to U.S. Provisional Patent Application No. 62/252,233 filed Nov. 6, 2015, both of which are hereby incorporated by reference in their entirety.

TECHNICAL FIELD

Particular embodiments are directed to wireless communications and, more particularly, to Channel State Information (CSI) reports for Machine-Type Communication (MTC).

BACKGROUND

Third Generation Partnership Project (3GPP) Long Term Evolution (LTE) uses Orthogonal Frequency Division Multiplexing (OFDM) in the downlink, where each downlink symbol may be referred to as an OFDM symbol, and Discrete Fourier Transform (DFT)-spread OFDM in the uplink, where each uplink symbol may be referred to as an SC-FDMA symbol. The basic LTE downlink physical resource comprises a time-frequency grid as illustrated in FIG. 1.

FIG. 1 illustrates an example OFDM symbol. The horizontal axis represents time and the other axis represents frequency. Each resource element corresponds to one OFDM subcarrier during one OFDM symbol interval. In the time domain, LTE downlink transmissions may be organized into radio frames.

FIG. 2 illustrates an example radio frame. Each radio frame is 10 ms and consists of ten equally-sized subframes of length Tsubframe=1 ms. For normal cyclic prefix, one subframe consists of 14 OFDM symbols. The duration of each symbol is approximately 71.4 µs.

Users are allocated a specific number of subcarriers for a predetermined amount of time. These are referred to as physical resource blocks (PRBs). PRBs thus have both a time and frequency dimension.

Machine-Type Communication (MTC) is a form of data communication involving one or more entities that do not necessarily need human interaction. MTC is an important and growing revenue stream for wireless network operators. MTC devices, such as monitors, sensors, controls, etc., may also be referred to as MTC user equipment (UE). Operators benefit from serving MTC devices with already deployed radio access technology. For example, LTE is a competitive radio access technology for efficient support of MTC.

Lower cost MTC devices facilitate and expedite implementation of the Internet of Things (IoT). In many applications, MTC devices may require low operational power consumption and may communicate with infrequent and short-duration burst transmissions and small-size data packets. In addition, MTC devices deployed deep inside buildings may require coverage enhancement in comparison to a defined LTE cell coverage footprint.

3GPP defines an MTC UE power saving mode that facilitates longer battery life and an MTC UE category that facilitates reduced modem complexity. Other goals are to further reduce UE cost and provide coverage enhancement. A particular enabler of cost reduction is reducing MTC UE bandwidth to 1.4 MHz in downlink and uplink within any system bandwidth. These MTC UEs may also be referred to as low-complexity UEs or coverage enhanced UEs.

LTE system bandwidth may be up to 20 MHz. The bandwidth is divided into PRBs at 180 kHz. Low-complexity UEs with reduced UE bandwidth of 1.4 MHz are only able to receive a part (up to 6 PRBs) of the total system bandwidth at a time. A group of 6 PRBs may be referred to as a PRB group.

To achieve adequate coverage for low-complexity UEs and other UEs operating delay tolerant MTC applications, time repetition techniques may be used to facilitate energy accumulation of the received signals at the UE. Physical data channels (e.g., Physical Downlink Shared Channel (PDSCH), Physical Uplink Shared Channel (PUSCH)) may use subframe bundling (or TTI bundling). Using subframe bundling, each Hybrid Automatic Repeat Request (HARQ) transmission consists of a bundle comprising multiple subframes, instead of just a single subframe. Repetition over multiple subframes may be applied to physical control channels. The particular number of repetitions may depend on a UE's coverage situation.

A UE may report channel conditions using a Channel State Indicator (CSI). A UE may report CSI aperiodically or periodically.

For aperiodic reporting, a higher layer network element semi-statically configures a UE to feedback Channel Quality Indicator (CQI), Pre-coding Matrix Indicator (PMI), and Rank Indicator (RI) for a PUSCH. The UE may use one of the reporting modes given in Table 1 and described in more detail below.

TABLE 1

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

Each of the following transmission modes support the corresponding reporting modes on PUSCH:

Transmission mode 1   Modes 2-0, 3-0
Transmission mode 2   Modes 2-0, 3-0
Transmission mode 3   Modes 2-0, 3-0
Transmission mode 4   Modes 1-2, 2-2, 3-1, 3-2
Transmission mode 5   Mode 3-1
Transmission mode 6   Modes 1-2, 2-2, 3-1, 3-2
Transmission mode 7   Modes 2-0, 3-0
Transmission mode 8   Modes 1-2, 2-2, 3-1, 3-2 if the UE is configured with PMI/RI reporting; modes 2-0, 3-0 if the UE is configured without PMI/RI reporting -continued

| | |
|---|---|
| Transmission mode 9 | Modes 1-2, 2-2, 3-1, 3-2 if the UE is configured with PMI/RI reporting and number of CSI-RS ports >1; modes 2-0, 3-0 if the UE is configured without PMI/RI reporting or number of CSI-RS ports = 1 |
| Transmission mode 10 | Modes 1-2, 2-2, 3-1, 3-2 if the UE is configured with PMI/RI reporting and number of CSI-RS ports >1; modes 2-0, 3-0 if the UE is configured without PMI/RI reporting or number of CSI-RS ports = 1 |

The aperiodic CSI reporting mode is given by the parameter cqi-ReportModeAperiodic which is configured by higher-layer signaling. LTE defines the reporting mode parameter as the enumerated type:

```
CQI-ReportModeAperiodic ::=ENUMERATED {rm12, rm20, rm22,
                                        rm30, rm31,
                                        rm32-v1250,
                                        spare2, spare1}.
```

The value rm12 corresponds to Mode 1-2, rm20 corresponds to Mode 2-0, rm22 corresponds to Mode 2-2, etc. PUSCH reporting modes are described in 3GPP TS 36.213. A UE may ignore cqi-ReportModeAperiodic-r10 when transmission mode 10 is configured for the serving cell on this carrier frequency. A UE may ignore cqi-ReportModeAperiodic-r10 configured for the PCell/PSCell when the transmission bandwidth of the PCell/PSCell in downlink is six resource blocks.

For periodic reporting, a higher layer network element may semi-statically configure a UE to periodically feedback CSI components (e.g., CQI, PMI, PTI, and/or RI) on a PUSCH using the one of the reporting modes given in Table 2 and described in more detail below.

TABLE 2

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Each of the following transmission modes support the corresponding reporting modes on PUCCH:

| | |
|---|---|
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 if the UE is configured with PMI/RI reporting; modes 1-0, 2-0 if the UE is configured without PMI/RI reporting |
| Transmission mode 9 | Modes 1-1, 2-1 if the UE is configured with PMI/RI reporting and number of CSI-RS ports>1; modes 1-0, 2-0 if the UE is configured without PMI/RI reporting or number of CSI-RS ports = 1 |
| Transmission mode 10 | Modes 1-1, 2-1 if the UE is configured with PMI/RI reporting and number of CSI-RS ports>1; modes 1-0, 2-0 if the UE is configured without PMI/RI reporting or number of CSI-RS ports = 1 |

For a UE configured in transmission modes 1-9, a higher-layer signaling network element configures one periodic CSI reporting mode for each serving cell. An example of the higher layer signaling is shown below.

```
CQI-ReportPeriodic ::= CHOICE {
  release                  NULL,
  setup                    SEQUENCE {
    cqi-PUCCH-ResourceIndex    INTEGER (0..1185),
    cqi-pmi-ConfigIndex        INTEGER (0..1023),
    cqi-FormatIndicatorPeriodic CHOICE {
      widebandCQI    NULL,
      subbandCQI     SEQUENCE {INTEGER (1..4)}
    },
    ri-ConfigIndex             INTEGER (0..1023)
      OPTIONAL, -- Need OR
    simultaneousAckNackAndCQI   BOOLEAN
  }
}
```

For a UE configured in transmission mode 10, a higher-layer signaling network element may configure multiple periodic CSI reports corresponding to one or more CSI processes per serving cell on PUCCH.

The reporting modes described above, however, may not account for particular attributes of MTC UEs. For example, many MTC UEs only have a single receiving antenna, thus a RI=1 may be assumed.

Additionally, transmission modes may vary for UEs that use Cell Specific Reference Signals (CRS) and those that use Demodulation Reference Signals (DMRS). For example, low-complexity UEs and UEs operating with coverage enhancement support transmission modes 1, 2, and 6 for CRS-based UEs, and transmission mode 9 for DMRS-based UEs.

MTC UEs may also operate using two coverage enhancement (CE) modes. For example, an RRC_CONNECTED UE may operate in either CE mode A or CE mode B. CE mode A specifies a set of behaviors for no repetitions or a small number of repetitions. CE mode B specifies a set of behaviors for a large number of repetitions. The CE mode may be signaled to the UE. For each physical channel, the number or repetitions that can be used in CE mode A or in CE mode B may overlap.

MTC UEs may use frequency hopping. For example, MTC UEs may use frequency hopping for downlink channels such as MPDCCH or PDSCH.

For these reasons, existing CSI reporting modes described above are not adequate to support low complexity, coverage enhanced MTC devices.

SUMMARY

Conventional channel state information (CSI) reporting modes do not adequately support low complexity, coverage enhanced machine type communication (MTC) devices. Particular embodiments define CSI reporting modes for low complexity and coverage enhanced MTC devices. The reporting mode may vary depending on whether frequency hopping is enabled or depending on a selected coverage enhancement (CE) mode.

According to some embodiments, a method of reporting a channel quality indicator (CQI) comprises receiving, in a wireless network comprising a carrier bandwidth of a first number of physical resource blocks (PRBs), a physical channel comprising a first PRB set with a bandwidth of a second number of PRBs. The second number of PRBs is less than the first number of PRBs. The method further comprises determining a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The method further comprises transmitting a report to a network node. The report comprises the determined CQI.

In particular embodiments, the method further comprises receiving, from the network node, an indication of particular PRBs that the first PRB set occupies in a subframe. The report may comprise a wideband CQI value. The wideband CQI value is determined based on transmission on all PRBs in the first set of PRBs.

In particular embodiments, determining the CQI further comprises selecting a precoding matrix that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe. The report comprises a precoding matrix indicator (PMI) associated with the selected precoding matrix.

According to some embodiments, the method further comprises receiving a physical channel comprising a plurality of PRB sets. Each PRB set comprises a bandwidth of the second number of PRBs, and the first PRB set is one of the plurality of PRB sets. The method further comprises determining a CQI that indicates a modulation and code rate of the physical channel that may be used to transmit the physical channel with a transport block error probability not exceeding 0.1 when the physical channel is transmitted in the plurality of PRB sets.

In particular embodiments, each PRB set of the plurality of PRB sets comprises different PRBs than the other PRB sets of the plurality of PRB sets. The second number of PRBs may be less than or equal to six PRBs. The wireless device may operate in CEModeA. The wireless device may be a machine type communication (MTC) wireless device and/or a user equipment (UE).

According to some embodiments, a method in a network node of receiving a CQI report comprises transmitting, in a wireless network comprising a carrier bandwidth of a first number of PRBs, a physical channel comprising a first PRB set with a bandwidth of a second number of PRBs. The second number of PRBs is less than the first number of PRBs. The method further comprises receiving, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The method may further comprise transmitting, to the wireless device, an indication of particular PRBs that the first PRB set occupies in a subframe.

In particular embodiments, the report may comprise a wideband CQI value. The wideband CQI value is determined based on transmission on all PRBs in the first set of PRBs. The received report may further comprise a precoding matrix indicator associated with a precoding matrix selected by the wireless device that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe.

According to some embodiments, the method further comprises transmitting a physical channel comprising a plurality of PRB sets. Each PRB set comprises a bandwidth of the second number of PRBs. The first PRB set is one of the plurality of PRB sets. The received report may comprise a CQI determined by the wireless device that indicates a modulation and code rate of the physical channel that may be used to transmit the physical channel with a transport block error probability not exceeding 0.1 when the physical channel is transmitted in the plurality of PRB sets.

In particular embodiments, each PRB set of the plurality of PRB sets comprises different PRBs than the other PRB sets of the plurality of PRB sets. The second number of PRBs may be less than or equal to six PRBs. The wireless device may operate in CEModeA. The wireless device may be a MTC wireless device and/or a UE.

According to some embodiments, a wireless device comprises processing circuitry operable to receive, in a wireless network comprising a carrier bandwidth of a first number of PRBs, a physical channel comprising a first PRB set with a bandwidth of a second number of PRBs. The second number of PRBs is less than the first number of PRBs. The processing circuitry if further operable to determine a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The processing circuitry transmits a report to a network node. The report comprises the determined CQI. The processing circuitry may be further operable to receive, from the network node, an indication of particular PRBs that the first PRB set occupies in a subframe.

In particular embodiments, the report comprises a wideband CQI value. The wideband CQI value is determined based on transmission on all PRBs in the first set of PRBs.

The processing circuitry may determine the CQI by selecting a precoding matrix that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe. The report may comprise a PMI associated with the selected precoding matrix.

According to some embodiments, the processing circuitry is further operable to receive a physical channel comprising a plurality of PRB sets. Each PRB set comprises a bandwidth of the second number of PRBs. The first PRB set is one of the plurality of PRB sets. The processing circuitry may be further operable to determine a CQI that indicates a modulation and code rate of the physical channel that may be used to transmit the physical channel with a transport block error probability not exceeding 0.1 when the physical channel is transmitted in the plurality of PRB sets.

In particular embodiments, each PRB set of the plurality of PRB sets comprises different PRBs than the other PRB sets of the plurality of PRB sets. The second number of PRBs may be less than or equal to six PRBs. The wireless device may operate in CEModeA. The wireless device is a MTC wireless device and/or a UE.

According to some embodiments, a network node comprises processing circuitry operable to transmit, in a wireless network comprising a carrier bandwidth of a first number of PRBs, a physical channel comprising a first PRB set with a bandwidth of a second number of PRBs. The second number of PRBs is less than the first number of PRBs. The processing circuitry is further operable to receive, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The processing circuitry may be further operable to transmit, to the wireless device, an indication of particular PRBs that the first PRB set occupies in a subframe.

In particular embodiments, the report comprises a wideband CQI value. The wideband CQI value is determined based on transmission on all PRBs in the first set of PRBs. The received report may further comprise a precoding matrix indicator associated with a precoding matrix selected by the wireless device that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe.

According to some embodiments, the processing circuitry is further operable to transmit a physical channel comprising a plurality of PRB sets. Each PRB set comprises a bandwidth of the second number of PRBs. The first PRB set is one of the plurality of PRB sets. The received report may comprise a CQI determined by the wireless device that indicates a modulation and code rate of the physical channel that may be used to transmit the physical channel with a transport block error probability not exceeding 0.1 when the physical channel is transmitted in the plurality of PRB sets.

In particular embodiments, each PRB set of the plurality of PRB sets comprises different PRBs than the other PRB sets of the plurality of PRB sets. The second number of PRBs may be less than or equal to six PRBs. The wireless device may operate in CEModeA. The wireless device may be a MTC wireless device and/or a UE.

According to some embodiments, a wireless device comprises a receiving module, a determining module, and a transmitting module. The receiving module is operable to receive, in a wireless network comprising a carrier bandwidth of a first number of PRBs, a physical channel comprising a first PRB set with a bandwidth of a second number of PRBs. The second number of PRBs is less than the first number of PRBs. The determining module is operable to determine a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The transmitting module is operable to transmit a report to a network node. The report comprises the determined CQI.

According to some embodiments, a network node comprises a transmitting module and a receiving module. The transmitting module is operable to transmit, in a wireless network comprising a carrier bandwidth of a first number of PRBs, a physical channel comprising a first PRB set with a bandwidth of a second number of PRBs. The second number of PRBs is less than the first number of PRBs; The receiving module is operable to receive, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe.

Also disclosed is a computer program product. The computer program product comprises instructions stored on non-transient computer-readable media which, when executed by a processor, performs the act of receiving, in a wireless network comprising a carrier bandwidth of a first number of physical resource blocks (PRBs), a physical channel comprising a first PRB set with a bandwidth of a second number of PRBs. The second number of PRBs is less than the first number of PRBs. The instructions further perform the act of determining a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. The instructions further perform the act of transmitting a report to a network node. The report comprises the determined CQI.

Another computer program product comprises instructions stored on non-transient computer-readable media which, when executed by a processor, performs the act of transmitting, in a wireless network comprising a carrier bandwidth of a first number of PRBs, a physical channel comprising a first PRB set with a bandwidth of a second number of PRBs. The second number of PRBs is less than the first number of PRBs. The instructions further perform the act of receiving, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe.

Particular embodiments may exhibit some of the following technical advantages. Particular embodiments define CSI reporting modes for low complexity, coverage enhanced MTC devices. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which:

FIG. 8 is a flow diagram illustrating an example method in a network node of receiving a CQI, according to some embodiments;

FIG. 11A is a block diagram illustrating an example embodiment of a network node; and FIG. 11B is a block diagram illustrating example components of a network node.

DETAILED DESCRIPTION

Figure 1:
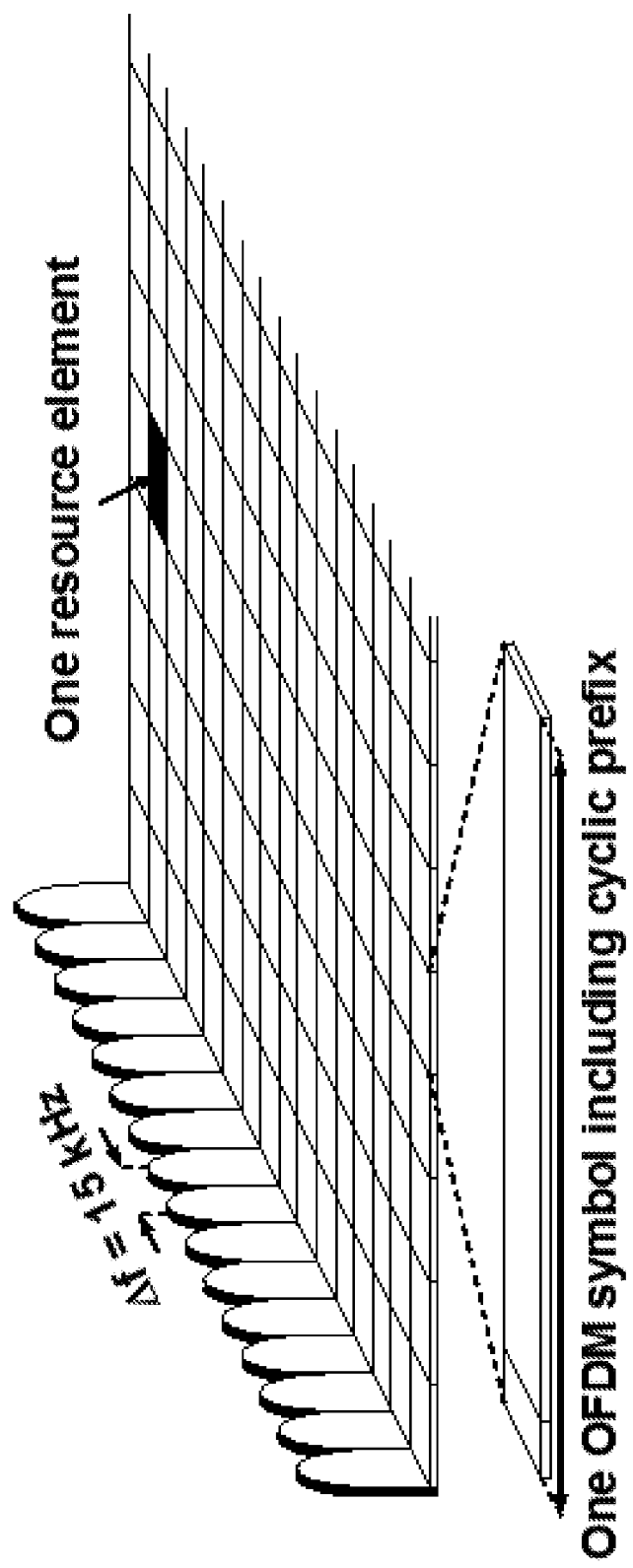
FIG. 1 illustrates an example Orthogonal Frequency-Division Multiplexed (OFDM) symbol.

Conventional channel state indicator (CSI) reporting modes do not account for particular attributes of machine type communication (MTC) user equipment (UEs). For example, many MTC UEs only have a single receiving antenna, thus a rank indicator (RI) may always be one. Transmission modes may vary for UEs that use Cell Specific Reference Signals (CRS) and those that use Demodulation Reference Signals (DMRS). For example, low-complexity UEs and UEs operating with coverage enhancement support transmission modes 1, 2, and 6 for CRS-based UEs, and transmission mode 9 for DMRS-based UEs.

MTC UEs may also operate using two coverage enhancement (CE) modes. For example, an RRC_CONNECTED UE may operate in either CE mode A or CE mode B. CE mode A specifies a set of behaviors for no repetitions or a small number of repetitions. CE mode B specifies a set of behaviors for a large number of repetitions. The CE mode may be signaled to the UE. For each physical channel, the number or repetitions that can be used in CE mode A or in CE mode B may overlap.

MTC UEs may also use frequency hopping. For example, MTC UEs may use frequency hopping for downlink channels such as MPDCCH or PDSCH.

Thus existing CSI reporting modes are not adequate to support low complexity, coverage enhanced MTC devices. An object of the embodiments described herein is to obviate at least the disadvantages above and define CSI reporting modes for low complexity and coverage enhanced MTC devices. The reporting mode may vary depending on whether frequency hopping is enabled or depending on a selected coverage enhancement mode.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 3-11B of the drawings, like numerals being used for like and corresponding parts of the various drawings. LTE is used throughout this disclosure as an example cellular system, but the ideas presented herein may apply to other wireless communication systems as well.

Figure 3:
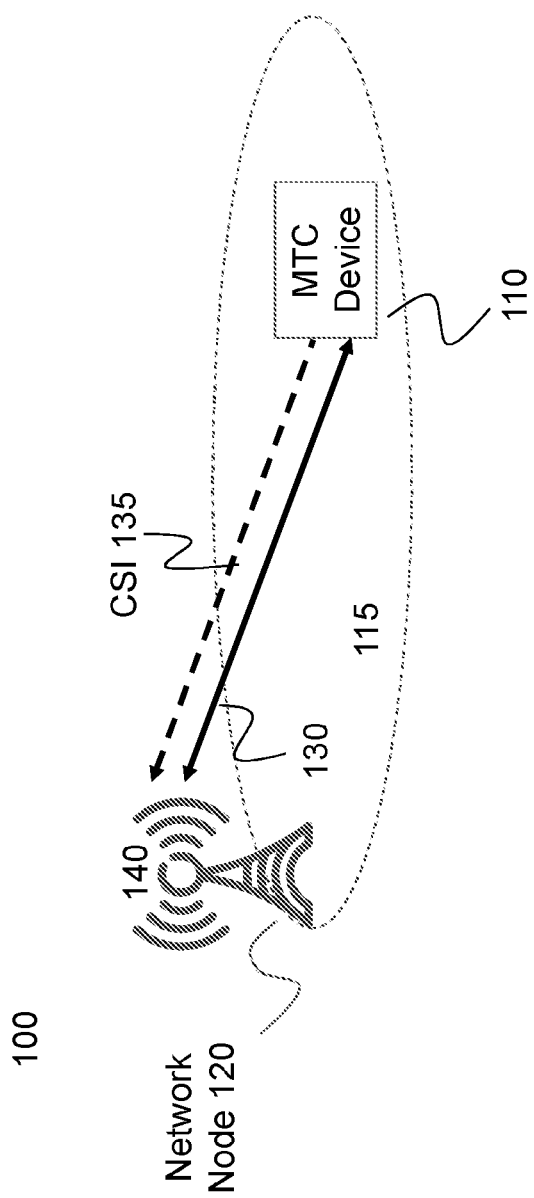
FIG. 3 illustrates an example wireless network, according to a particular embodiment.

FIG. 3 illustrates an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Wireless network 100 may include a carrier bandwidth of, for example, 20 MHz. Wireless device 110 may operate on a subset of the carrier bandwidth. For example, wireless device 110 may use a reduced bandwidth of 1.4 MHz (i.e., six physical resource blocks (PRBs)). In particular embodiments, network node 120 may signal to wireless device 110 an indication of particular PRBs that wireless device 110 should use for communication.

Figure 2:
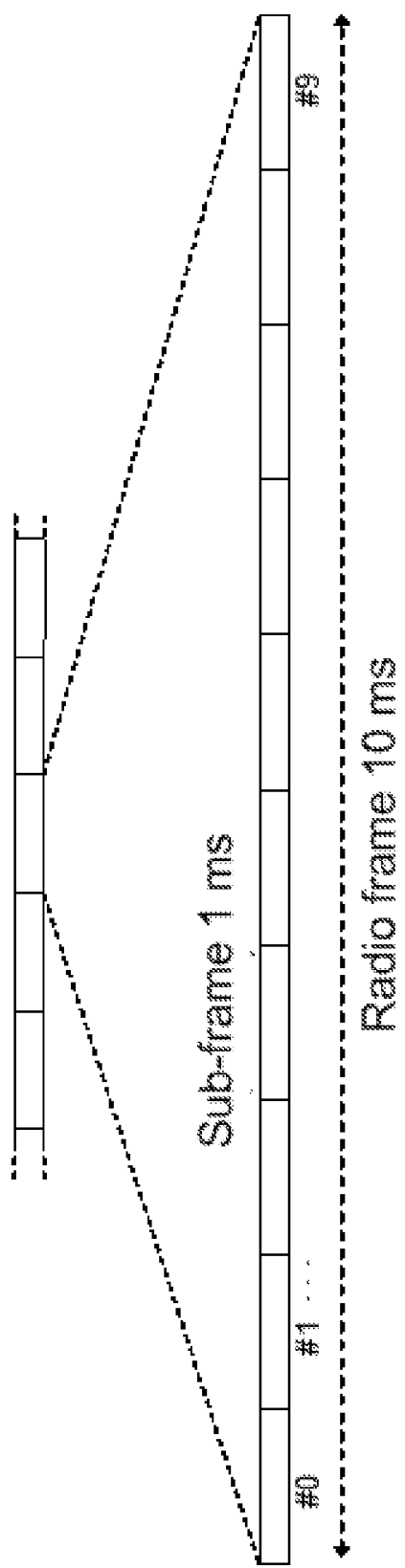
FIG. 2 illustrates an example radio frame.

Wireless signals 130 may include frames and subframes, such as those described with respect to FIGS. 1-2. Wireless signal 130 may include particular channels. For example, wireless signals 130 may include an MTC physical downlink control channel (MPDCCH) used by network node 120 for sending downlink control information (DCI) to wireless device 110. Wireless signal 130 may include a physical downlink shared channel (PDSCH) used by network node 120 to send user data to wireless device 110.

Wireless device 110 may measure the signal strength and other qualities of a channel, such as the PDSCH. Based on the measurements, wireless device 110 may determine a channel quality indicator (CQI) that indicates a modulation and code rate of the physical channel that may be used to transmit the physical channel with a transport block error probability not exceeding 0.1 when the physical channel is transmitted in the reduced bandwidth PRBs used by wireless device 110. Wireless device 110 may transmit channel state indicator (CSI) report 135 to network node 110. CSI report 135 includes the determined CQI.

In particular embodiments, network node 120 may use a precoding matrix to transmit wireless signals 130 to wireless device 110. Wireless device 110 may determine a precoding matrix indicator (PMI) and include the PMI in CSI report 135 transmitted to network node 120.

In particular embodiments, wireless device 110 may be configured with frequency hopping. For example, the particular PRBs used for communicating wireless signals 130 between network node 120 and wireless device 110 may change with each subframe.

Each network node 120 may have a single transmitter 140 or multiple transmitters 140 for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

Figure 4:
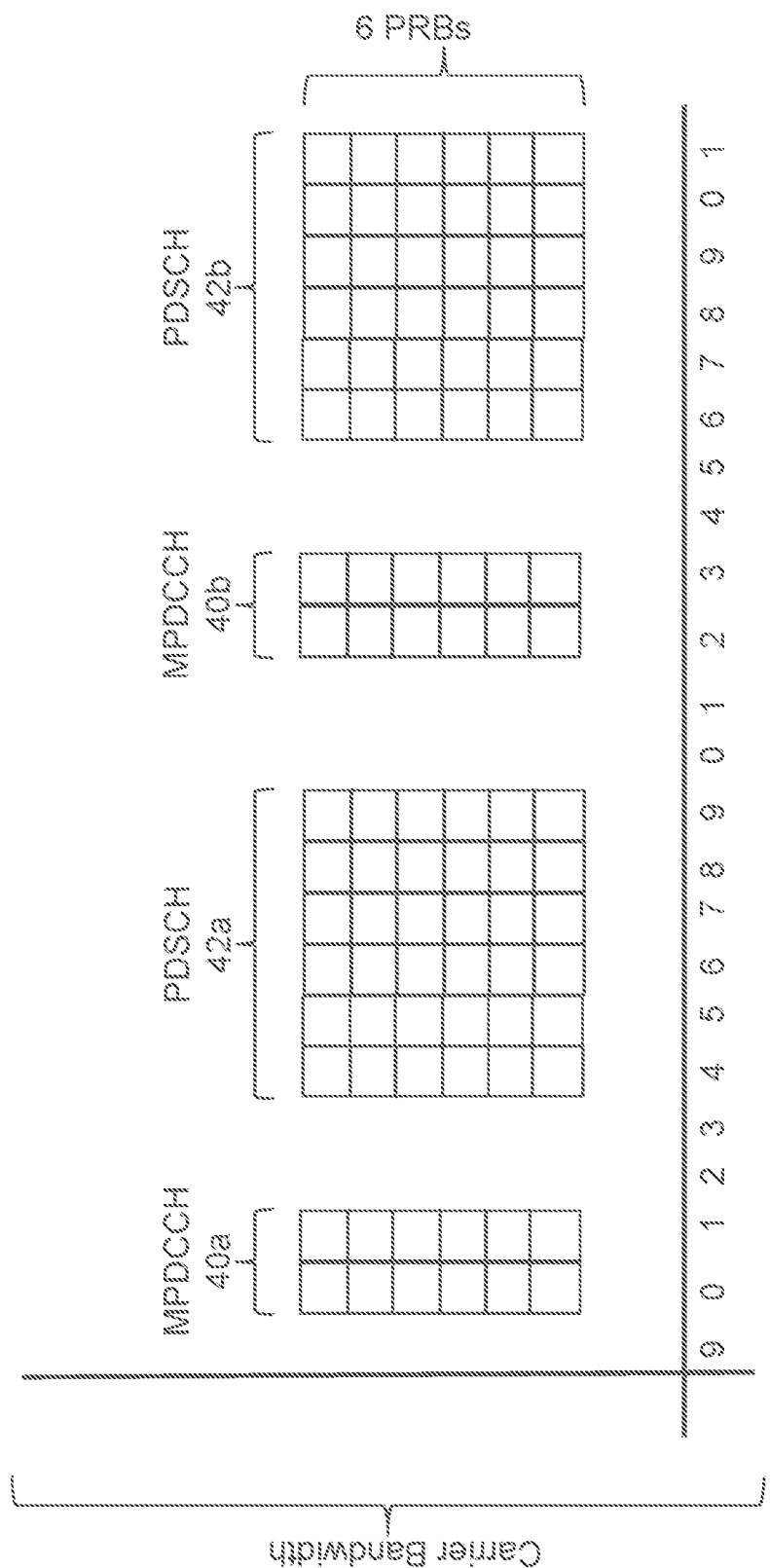
FIG. 4 illustrates an example narrowband with six physical resource blocks (PRBs), according to a particular embodiment.

FIG. 4 illustrates an example narrowband with six physical resource blocks (PRBs), according to a particular embodiment. For example, wireless device 110 may use the illustrated PRBs to communicate wireless signals 130 with network node 120. The horizontal axis represents time and includes subframe numbers. The vertical axis represents frequency.

The carrier bandwidth may be, for example, 20 MHz. An MTC wireless device, such as wireless device 110, may operate on a subset of the carrier bandwidth. For example, in the illustrated embodiment, the network node and the wireless device communicate using six PRBs. In subframe 0, MPDCCH 40 uses six PRBs. For coverage enhancement, MPDCCH 40 may be repeated across several subframes (e.g., subframe 1, 2, etc.). MPDCCH 40 includes downlink control information that indicates to wireless device 110 which PRBs will include PDSCH 42.

PDSCH 42 may include user data and/or reference signals. In the illustrated example, PDSCH 42 includes six PRBs per subframe. For coverage enhancement, PDSCH may be repeated across several subframes.

In the example illustrated in FIG. 4, the same six PRBs are used in each subframe (e.g., PDSCH 42*a* and 42*b* use the same six PRBs as MPDCCH 40*a* and 40*b*). Other embodiments may include frequency hopping. An example is illustrated in FIG. 5.

Figure 5:
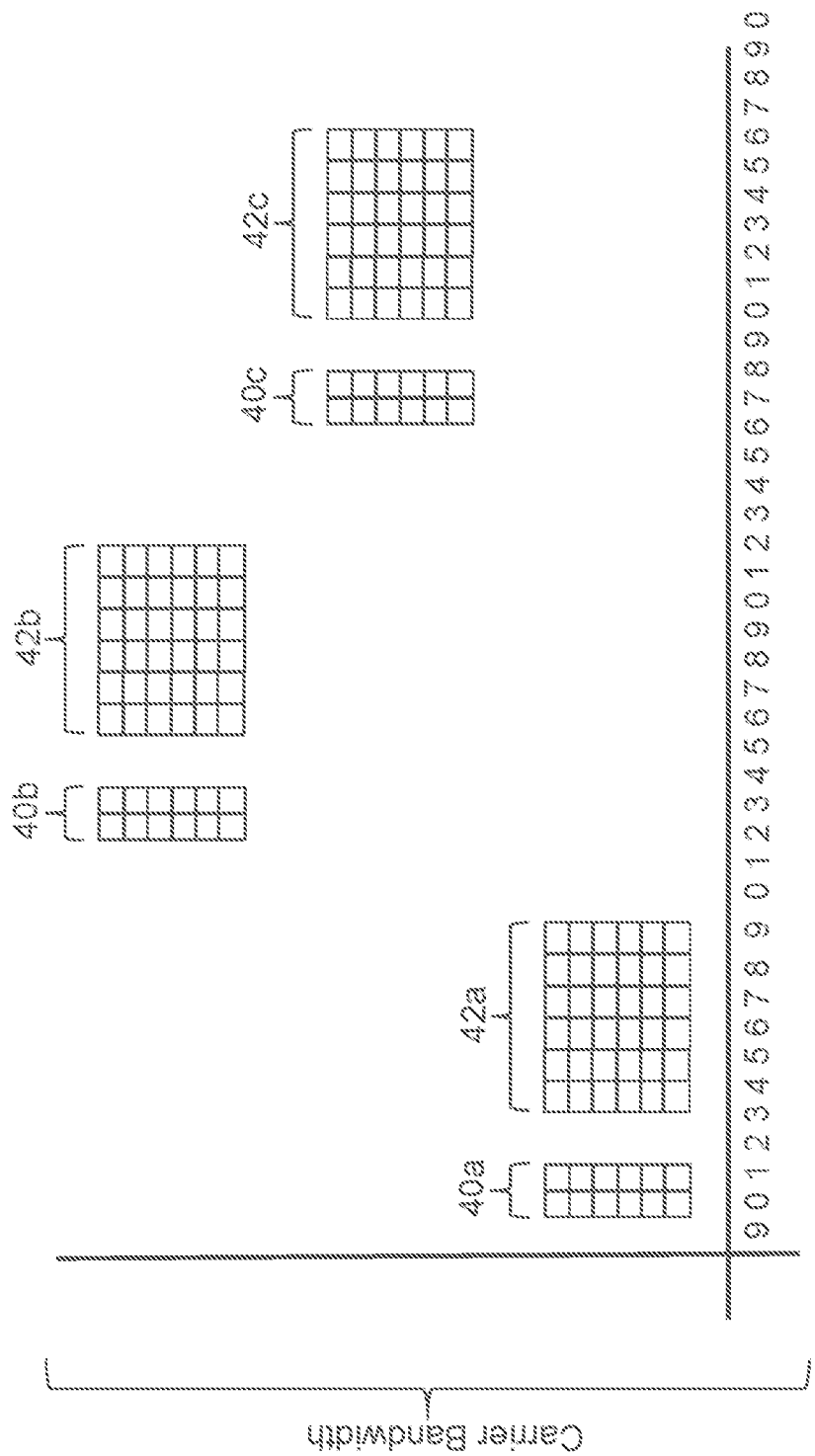
FIG. 5 illustrates an example narrowband with six physical resource blocks (PRBs) and frequency hopping, according to a particular embodiment.

FIG. 5 illustrates an example narrowband with six physical resource blocks (PRBs) and frequency hopping, according to a particular embodiment. The horizontal axis represents time and includes subframe numbers. The vertical axis represents frequency. In a first time interval, network node 120 may communicate with wireless device 110 using the set of six PRBs of MPDCCH 40*a* and PDSCH 42*a*. In a second time interval, communication may use the set of six PRBs of MPDCCH 40*b* and PDSCH 42*b*. A third time interval may include the set of six PRBs of MPDCCH 40*c* and PDSCH 42*c*. Thus, the illustrated example includes physical channels comprising three PRB sets, and each PRB set comprises a bandwidth of six PRBs. Each PRB set includes different PRBs than any of the other PRB sets. In other embodiments, PRBs may overlap between PRB sets.

Although FIGS. 4 and 5 illustrate particular example combinations of PRBs, subframes, and spacing between MPDCCH and PDSCH transmissions, other embodiments may include any suitable combinations.

The following example embodiments describe periodic and aperiodic CSI reporting modes for PUSCH and PUCCH physical channels used by MTC UEs. While MTC UEs are described herein, these embodiments may apply to other UE types and other physical channels as well.

CSI reporting modes may be determined by frequency hopping status, CE mode, or a combination of both. The following example embodiments describe reporting modes available for various UE configurations.

For low-complexity or coverage enhanced UEs, the PDSCH operates within a given narrowband of six PRBs for a subframe. Furthermore, both the MPDCCH and the PDSCH may (or may not) be configured with frequency hopping (e.g., FIG. 4 or 5).

In the embodiments described herein, the subband size may be set to six PRBs to match the narrowband size. Thus, each of the subbands are one-to-one mapped with each of the defined narrowbands. In other embodiments, a subband size of four PRBs may be used. In particular embodiments, the narrowband and the subband may each comprise any suitable number of PRBs.

In particular embodiments, aperiodic CSI reporting using PUSCH may include the reporting modes described below. The reporting modes may vary depending on whether frequency hopping is enabled or disabled.

As described above, MTC UEs may use transmission modes 1, 2, 6, and 9. Thus, the applicable subset of reporting modes for aperiodic PUSCH is as follows:

| | |
|---|---|
| Transmission mode 1 | Modes 2-0, 3-0 |
| Transmission mode 2 | Modes 2-0, 3-0 |
| Transmission mode 6 | Modes 1-2, 2-2, 3-1, 3-2 |
| Transmission mode 9 | Modes 1-2, 2-2, 3-1, 3-2 if the UE is configured with PMI/RI reporting and number of CSI-RS ports >1; modes 2-0, 3-0 if the UE is configured without PMI/RI reporting or number of CSI-RS ports = 1 |

When frequency hopping of PDSCH is disabled, the PDSCH uses the same 6-PRB narrowband for all repetitions across subframes (example illustrated in FIG. 4). The associated MPDCCH may provide the location of the narrowband of the PDSCH.

In particular embodiments, the reporting modes degenerate to "wideband", where the wideband is equivalent to the provided 6-PRB narrowband. Wideband is effectively the same as subband (i.e., a six PRB narrowband in either case). There is no differentiation of "wideband", "UE Selected (subband CQI)" or "Higher Layer-configured (subband CQI)".

Accordingly, for transmission modes 1 and 2, reporting modes 2-0 and 3-0 effectively become the same. They both comprise a single 4-bit wideband CQI without PMI reporting. In particular embodiments, transmission modes 1 and 2 may support reporting mode 3-0 and not support reporting mode 2-0. For transmission modes 6 and 9, reporting modes 1-2, 2-2, and 3-2 may not apply to low-complexity or coverage enhanced MTC UEs.

For transmission mode 6, reporting mode 3-1 may apply to low-complexity or coverage enhanced MTC UEs. Reporting mode 3-1 contains a subband CQI, which refers to a single CQI for the configured 6-PRB narrowband. Reporting mode 3-1 also contains a single PMI, where the single PMI is the UE-preferred PMI across the 6-PRB narrowband. Reporting mode 3-1 may not include the subband CQI differential. Other embodiments may include the differential CQI field and fill it with dummy bits (e.g., all zeros). This maintains the existing reporting format, so that new transmit formats do not need to be introduced.

For transmission mode 9, reporting modes 3-0 and 3-1 may apply to low-complexity or coverage enhancement MTC UEs. Reporting mode 3-1 is supported when the UE is configured with PMI/RI reporting and the number of CSI-RS ports is greater than one. Reporting mode 3-0 is supported when the UE is configured without PMI/RI reporting or the number of CSI-RS ports equals one. In this case, an eNB may determine a precoder to use on DMRS. This may be applicable when reciprocity is leveraged for time division duplex (TDD) operation where information for deriving a precoder choice is available.

Reporting mode 3-0 may not include the subband CQI differential. Other embodiments may include the differential CQI field and fill it with dummy bits (e.g., all zeros). This maintains the existing reporting format, so that new transmit formats do not need to be introduced. Reporting mode 3-0 contains a subband CQI, which refers to a single CQI for the configured 6-PRB narrowband.

When frequency hopping of PDSCH is enabled, particular embodiments may assume for CQI reporting purposes that the UE hops across all the narrowbands configured in the frequency hopping pattern. In practice, a UE may not hop over all narrowbands in the frequency hopping pattern if the number of repetitions is small. The frequency hopping pattern is provided to the UE, and it may or may not cover all narrowbands available in the uplink system bandwidth (example in FIG. 5).

For frequency hopping, the subband modes ("UE Selected" and "Higher Layer-configured") may not be used. There is no differentiation of "wideband", "UE Selected (subband CQI)" or "Higher Layer-configured (subband CQI)". Wideband (wideband CQI) may be supported. In particular embodiments, wideband CQI refers to the average among all subbands on which the UE observes MPDCCH (i.e., the set of narrowbands in the frequency hopping pattern).

In particular embodiments, transmission mode 6 for low-complexity or coverage enhanced MTC UEs includes reporting mode 3-1. Reporting mode 3-1 includes a subband CQI, which refers to a single CQI for the set of configured narrowbands in the frequency hopping pattern. Reporting mode 3-1 also contains a single PMI, where the single PMI is the UE-preferred PMI across the set of configured narrowbands in the frequency hopping pattern.

In particular embodiments, transmission mode 9 does not support reporting modes 1-2, 2-2, and 3-2 if the UE is configured with PMI/RI reporting and number of CSI-RS ports is greater than one. Reporting mode 3-1 is supported in a manner similar to transmission mode 6. If the UE is configured without PMI/RI reporting or the number of CSI-RS ports equals one, then reporting mode 2-0 is not supported. Reporting mode 3-0 is supported. Reporting mode 3-0 includes a subband CQI, which refers to a single CQI for the set of configured narrowbands in the frequency hopping pattern.

In particular embodiments, modes corresponding to multiple PMI are not supported. In other embodiments, modes corresponding to multiple PMI may be supported with modification. For example, reporting mode 1-2 may be modified. Reporting mode 1-2 may be modified such that for each subband a preferred precoding matrix may be selected from the codebook subset assuming transmission only in the subband.

The subband may refer to the 6-PRB narrowband. A UE may support one wideband CQI value which is calculated assuming the use of the corresponding selected precoding matrix in each subband and transmission on the set S subbands. The set S subbands may comprise the set of narrowbands configured in the frequency hopping pattern. The UE may report the selected precoding matrix indicator for each set S subband except with 8 CSI-RS ports configured for transmission modes 9 or with alternativeCodeBookEnabledFor4TX-r12=TRUE configured for transmission modes 9.

In these scenarios a first precoding matrix indicator $i_1$ is reported for the set S subbands and a second precoding matrix indicator $i_2$ is reported for each set S subband. The Subband size may be set to six PRBs (i.e., the size of the narrowband). For all supported transmission modes, the reported PMI and CQI values may be calculated assuming a rank 1. Particular embodiments may reuse reporting mode 3-2 by removing the differential CQI, which effectively degenerates to wideband CQI only. In particular embodiments, the subband CQI differential may be included in reporting mode 3-2, and it may provide per-subband CQI information in addition to the wideband CQI.

Particular embodiments may modify reporting mode 3-0 to create a reporting format of "wideband CQI" and "no PMI." For example, reporting mode 3-0 may not include the subband CQI differential fields. In another example, the differential CQI field is included. It is filled with dummy bits (e.g., all zeros). This maintains the existing reporting format, so that new transmit formats do not need to be introduced.

Particular embodiments may modify mode 3-1 to create a reporting format of "wideband CQI" and "single PMI." For example, reporting mode 3-1 may not include the subband CQI differential. In another example, the differential CQI field is included. It is filled with dummy bits (e.g., all zeros). This maintains the existing reporting format, so that new transmit formats do not need to be introduced.

As a summary of the various modes described above, for low-complexity or coverage enhancement MTC UEs, certain embodiments perform aperiodic CSI reporting carried by PUSCH with the following characteristics. For transmission modes 1 and 2, reporting mode 2-0 is not supported and reporting mode 3-0 is supported. For transmission mode 6, reporting modes 1-2, 2-2, and 3-2 are not supported, and reporting mode 3-1 is supported. For transmission mode 9, if the UE is configured with PMI/RI reporting and the number of CSI-RS ports is greater than one, then reporting modes 1-2, 2-2, and 3-2 are not supported and reporting mode 3-1 is supported. If the UE is configured without PMI/RI reporting or the number of CSI-RS ports equals one, then reporting mode 2-0 is not supported, and reporting mode 3-0 is supported.

In particular embodiments, periodic CSI reporting using PUCCH may include the reporting modes described below. The reporting modes may vary depending on whether frequency hopping is enabled or disabled.

As described above, MTC UEs may use transmission modes 1, 2, 6, and 9. Thus, the applicable subset of reporting modes for periodic PUCCH is as follows:

| | |
|---|---|
| Transmission mode 1 | Modes 1-0, 2-0 |
| Transmission mode 2 | Modes 1-0, 2-0 |
| Transmission mode 6 | Modes 1-1, 2-1 |
| Transmission mode 9 | Modes 1-1, 2-1 if the UE is configured with PMI/RI reporting and number of CSI-RS ports >1; modes 1-0, 2-0 if the UE is configured without PMI/RI reporting or number of CSI-RS ports = 1 |

When frequency hopping of PDSCH is disabled, the reporting modes effectively degenerate to "wideband", which is equivalent to the provided 6-PRB narrowband. Wideband mode is effectively the same as subband mode (i.e., a six PRB narrowband in either case). There is no differentiation of "wideband" and "UE Selected". Accordingly, for transmission modes 1 and 2, reporting modes 1-0 and 2-0 are effectively the same. They comprise a single 4-bit wideband CQI. For example, reporting mode 1-0 may be adopted for a UE. Reporting mode 1-0 contains a "wideband" CQI, which here means a single CQI for the configured 6-PRB narrowband.

In particular embodiments, transmission mode 6 may support reporting mode 1-1 and not support reporting mode 2-1. Reporting mode 1-1 may contain a "wideband" CQI, which here means a single CQI for the configured 6-PRB narrowband. Reporting mode 1-1 may contain a single PMI, where the single PMI is the UE-preferred PMI across the 6-PRB narrowband.

Transmission mode 9 may support reporting mode 1-1 if the UE is configured with PMI/RI reporting and the number of CSI-RS ports is greater than one. Transmission mode 9 may support reporting mode 1-0 if the UE is configured without PMI/RI reporting or the number of CSI-RS ports equals one. Reporting mode 1-1 may be modified in a similar manner as that of transmission mode 6, described above. Reporting mode 1-0 may contain a "wideband" CQI, which refers to a single CQI for the configured 6-PRB narrowband.

When frequency hopping of PDSCH is enabled, particular embodiments may support the same reporting modes as when frequency hopping is disabled. A difference is that the reference resource changes. For example, when frequency hopping is disabled, CSI may be generated assuming one narrowband. When frequency hopping is enabled, CSI may be generated assuming the set of 6-PRB narrowbands configured by the frequency hopping pattern versus four narrowbands that the UE hops to.

For example, transmission modes 1 and 2 may support reporting mode 1-0 for low-complexity or coverage enhancement MTC UEs. Reporting mode 1-0 contains a "wideband" CQI, which here means a single CQI for the set of 6-PRB narrowbands configured by the frequency hopping pattern.

Transmission mode 6 may support reporting mode 1-1. Reporting mode 2-1 is not supported. Reporting mode 1-1 may contain a "wideband" CQI, which here means a single CQI for the set of 6-PRB narrowbands configured by the frequency hopping pattern. Reporting mode 1-1 may contain a single PMI, where the single PMI is the UE-preferred PMI across the set of 6-PRB narrowbands configured by the frequency hopping pattern.

Transmission mode 9 may support reporting mode 1-1 if the UE is configured with PMI/RI reporting and the number of CSI-RS ports is greater than one. Transmission mode 9 may support reporting mode 1-0 if the UE is configured without PMI/RI reporting or the number of CSI-RS ports equals one. Reporting mode 1-1 may be modified in a similar manner as that of transmission mode 6, described above. Reporting mode 1-0 may contain a "wideband" CQI, which refers to a single CQI for the configured 6-PRB narrowband.

As a summary, for low-complexity or coverage enhancement MTC UEs, certain embodiments perform periodic CSI reporting carried by PUCCH with the following characteristics. For transmission modes 1 and 2, reporting mode 2-0 is not supported and reporting mode 1-0 is supported. For transmission mode 6, reporting mode 2-1 is not supported and reporting mode 1-1 is supported. For transmission mode 9, if the UE is configured with PMI/RI reporting and the number of CSI-RS ports is greater than one, then reporting mode 2-1 is not supported, and reporting mode 1-1 is supported. If the UE is configured without PMI/RI reporting or the number of CSI-RS ports equals one, then reporting mode 2-0 is not supported, and reporting mode 1-0 is supported.

In general, CE mode B has lower data throughput capacity than CE mode A because the channel condition is expected to be degraded compared to CE mode A. In particular embodiments, CSI reporting modes and/or formats may be determined by CE mode. For example, for CE mode A the low-complexity or coverage enhancement MTC UE may use a first reporting mode, such as a CSI reporting mode according to "frequency hopping is disabled." For CE mode B, the low-complexity or coverage enhancement MTC UE may use a second reporting mode, such as a CSI reporting mode according to "frequency hopping is enabled."

In another example, the reporting modes for aperiodic CSI reporting may be modified to a compact mode where the number of bits to send for CSI reporting is as few as possible, e.g., (a) remove RI reports; (b) removed fields for subband CQI; (c) remove fields for subband PMI. In particular embodiments, the CSI reporting mode and/or format may be determined jointly by frequency hopping configuration and CE mode. The reporting modes for aperiodic CSI reporting is designed for each combination of {CE mode (mode A, mode B), frequency hopping (enabled/disabled)}, where the number of bits to send for CSI reporting is as few as possible.

Particular embodiments include methods performed by a wireless device and other embodiments include methods performed by a network node. Example methods are described with respect to FIGS. 6-9.

Figure 6:
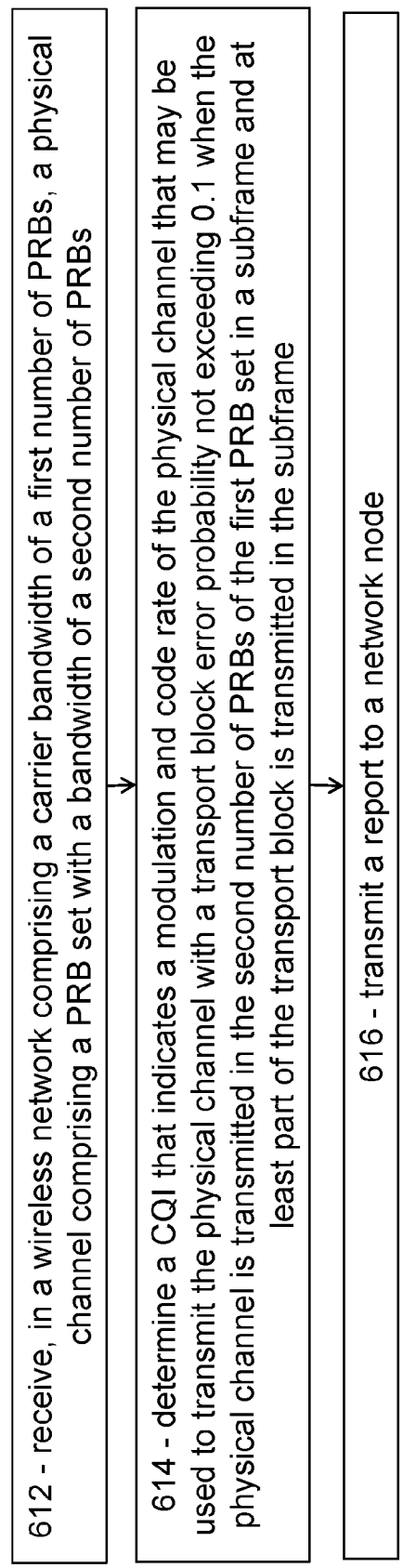
FIG. 6 is a flow diagram illustrating an example method in a wireless device of reporting a channel quality indicator (CQI), according to some embodiments.

FIG. 6 is a flow diagram illustrating an example method in a wireless device of reporting a channel quality indicator (CQI), according to some embodiments. In particular embodiments, one or more steps of FIG. 6 may be performed by wireless device 110 of wireless network 100 described with respect to FIG. 3.

At step 612, a wireless device operating in a wireless network comprising a carrier bandwidth of a first number of PRBs, receives a physical channel comprising a PRB set with a bandwidth of a second number of PRBs. For example, wireless device 110 operating in wireless network 100 with a carrier bandwidth of 20 MHz receives PDSCH 42 from network node 120. The bandwidth of PDSCH 42 comprises a PRB set with a bandwidth of six PRBs, which is less than the carrier bandwidth. In other embodiments, the bandwidth of the physical channel may be less than six PRBs, or any suitable number of PRBs that is less than the carrier bandwidth.

In particular embodiments, the wireless device may receive, from a network node, an indication of particular PRBs that the first PRB set occupies in a subframe. For example, wireless device 110 may receive signaling from network node 120 indicating the six particular PRBs that network node 120 will use to transmit PDSCH 42.

At step 614, the wireless device determines a CQI that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. For example, wireless device 110 may determine a CQI that indicates a modulation and code rate of PDSCH 42 so that network node 120 may transmit PDSCH 42 with a transport block error probability not exceeding 0.1 when it transmits PDSCH 42 in the six PRB set.

In particular embodiments, the CQI value comprises a wideband CQI value. The wideband CQI value is determined based on transmission on all PRBs in the first set of PRBs. For example, even though wireless network 100 has a carrier bandwidth of 20 MHz, wireless device 110 does not calculate the wideband CQI value for the carrier bandwidth. Wireless device 110 calculates the wideband CQI value on the transmissions from network node 120 on all six of the PRBs of PDSCH 42.

In particular embodiments, the wireless device may select a precoding matrix that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe. For example, wireless device 110 may determine a precoding matrix that network node 120 may use to transmit PDSCH 42 to wireless device 110.

In particular embodiments, the wireless device may determine the CQI based on any of the embodiments described above with respect to transmission modes and reporting modes.

At step 616, the wireless device transmits a report to the network node. For example, wireless device 110 transmits CSI report 135 to network node 120. CSI report 135 includes the CQI determined at step 614. If wireless device 110 selected a precoding matrix at step 614, then CSI report 135 may include a PMI that indicates the selected precoding matrix. In particular embodiments, the wireless device may transmit the CSI report based on any of the embodiments described above with respect to transmission modes and reporting modes.

Modifications, additions, or omissions may be made to method 600. Additionally, one or more steps in method 600 of FIG. 6 may be performed in parallel or in any suitable order. All or parts of method 600 may be repeated over time as necessary.

Figure 7:
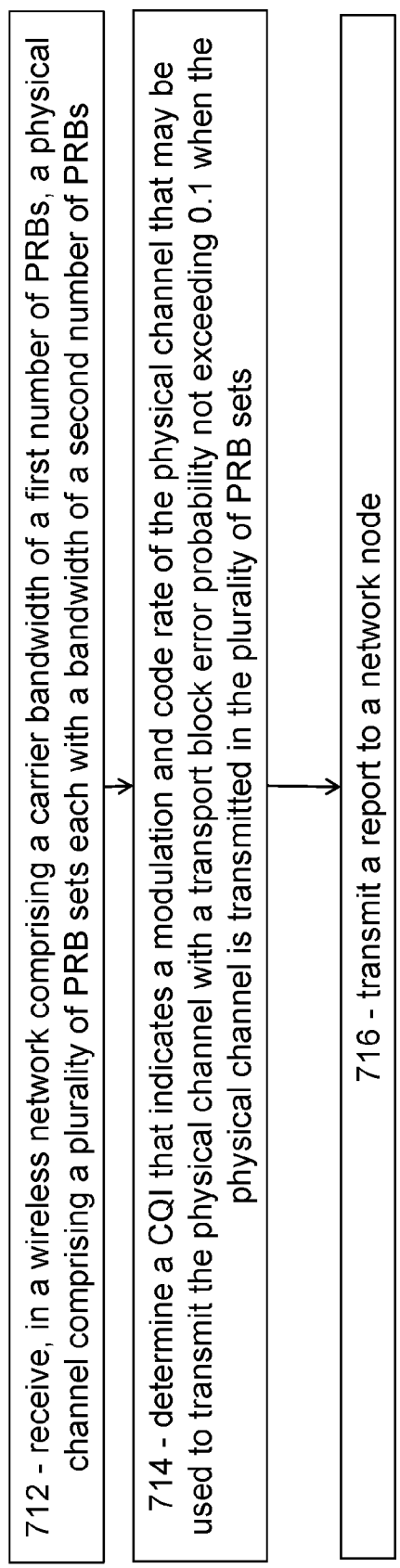
FIG. 7 is a flow diagram illustrating an example method in a wireless device of reporting a CQI with frequency hopping, according to some embodiments.

FIG. 7 is a flow diagram illustrating an example method in a wireless device of reporting a CQI with frequency hopping, according to some embodiments. In particular embodiments, one or more steps of FIG. 7 may be performed by wireless device 110 of wireless network 100 described with respect to FIG. 3.

At step 712, a wireless device operating in a wireless network comprising a carrier bandwidth of a first number of PRBs, receives a physical channel comprising a plurality of PRB sets each with a bandwidth of a second number of PRBs. For example, wireless device 110 operating in wireless network 100 with a carrier bandwidth of 20 MHz receives PDSCH 42 from network node 120. Wireless device 110 is configured to use frequency hopping across a plurality of PRB sets. The bandwidth of PDSCH 42 comprises three PRB sets (e.g., PDSCH 42a, 42b, and 42c), each with a bandwidth of six PRBs, which is less than the carrier bandwidth.

In particular embodiments, the wireless device may receive, from a network node, an indication of particular PRBs that the plurality of PRB sets occupy in a subframe. For example, wireless device 110 may receive signaling from network node 120 indicating the six particular PRBs for each PRB set (e.g., PDSCH 42a, 42b and 42c) that network node 120 will use to transmit PDSCH 42.

At step 714, the wireless device determines a CQI that indicates a modulation and code rate of the physical channel that may be used to transmit the physical channel with a transport block error probability not exceeding 0.1 when the physical channel is transmitted in the plurality of PRB sets. For example, wireless device 110 may determine a CQI that indicates a modulation and code rate of PDSCH 42 so that network node 120 may transmit PDSCH 42 with a transport block error probability not exceeding 0.1 when it transmits PDSCH 42 in each of the six-PRB sets (e.g., PDSCH 42a, 42b and 42c).

In particular embodiments, the wireless device may determine the CQI based on any of the embodiments described above with respect to transmission modes and reporting modes. Any of the embodiments described above with respect to FIG. 6 may be extended to apply to the frequency hopping embodiments described with respect to FIG. 7.

At step 716, the wireless device transmits a report to the network node. For example, wireless device 110 transmits CSI report 135 to network node 120. CSI report 135 includes the CQI determined at step 714. In some embodiments, CSI report 135 may include a PMI that indicates a selected precoding matrix. In particular embodiments, the wireless device may transmit the CSI report based on any of the embodiments described above with respect to transmission modes and reporting modes.

Modifications, additions, or omissions may be made to method 700. Additionally, one or more steps in method 700 of FIG. 7 may be performed in parallel or in any suitable order. All or parts of method 700 may be repeated over time as necessary.

FIG. 8 is a flow diagram illustrating an example method in a network node of receiving a CQI, according to some embodiments. In particular embodiments, one or more steps of FIG. 8 may be performed by network node 120 of wireless network 100 described with respect to FIG. 3.

At step 812, a network node transmits, in a wireless network comprising a carrier bandwidth of a first number of PRBs, a physical channel comprising a first PRB set with a bandwidth of a second number of PRBs. For example, network node 120 transmits, in wireless network 100 comprising a carrier bandwidth of 20 MHz, PDSCH channel 42 comprising a first PRB set with a bandwidth of six PRBs, which is less than the carrier bandwidth. In other embodiments, the bandwidth of the physical channel may be less than six PRBs, or any suitable number of PRBs that is less than the carrier bandwidth.

In particular embodiments, the network node may transmit, to a wireless device, an indication of particular PRBs that the first PRB set occupies in a subframe. For example, network node 120 may transmit signaling to wireless device 110 indicating the six particular PRBs that network node 120 will use to transmit PDSCH 42.

At step 814, the network node receives, from a wireless device, a report comprising a CQI determined by the wireless device that indicates a modulation and code rate of the physical channel that may be used to transmit the physical channel with a transport block error probability not exceeding 0.1 when the physical channel is transmitted in the second number of PRBs of the first PRB set in a subframe and at least part of the transport block is transmitted in the subframe. For example, wireless device 110 may determine a CQI that indicates a modulation and code rate of PDSCH 42 so that network node 120 may transmit PDSCH 42 with a transport block error probability not exceeding 0.1 when it transmits PDSCH 42 in the six PRB set.

In particular embodiments, the CQI value comprises a wideband CQI value. The wideband CQI value is determined based on transmission on all PRBs in the first set of PRBs. For example, even though wireless network 100 has a carrier bandwidth of 20 MHz, wireless device 110 does not calculate the wideband CQI value for the carrier bandwidth. Wireless device 110 calculates the wideband CQI value on the transmissions from network node 120 on all six of the PRBs of PDSCH 42.

In particular embodiments, the wireless device may select a precoding matrix that may be used to transmit the physical channel with a transport block error probability not exceeding 0.1 when the physical channel is transmitted, using the precoding matrix, in the second number of PRBs of the first PRB set in a subframe and at least part of the transport block is transmitted in the subframe. For example, wireless device 110 may determine a precoding matrix that network node 120 may use to transmit PDSCH 42 to wireless device 110.

In particular embodiments, the wireless device may determine the CQI based on any of the embodiments described above with respect to transmission modes and reporting modes.

The network node receives the report from the wireless device. For example, network node 120 may receive CSI report 135 from wireless device 110. CSI report 135 may include the determined CQI and/or a selected a PMI that indicates a selected precoding matrix. In particular embodiments, the network node may receive the CSI report based on any of the embodiments described above with respect to transmission modes and reporting modes.

Modifications, additions, or omissions may be made to method 800. Additionally, one or more steps in method 800 of FIG. 8 may be performed in parallel or in any suitable order. All or parts of method 800 may be repeated over time as necessary.

Figure 9:
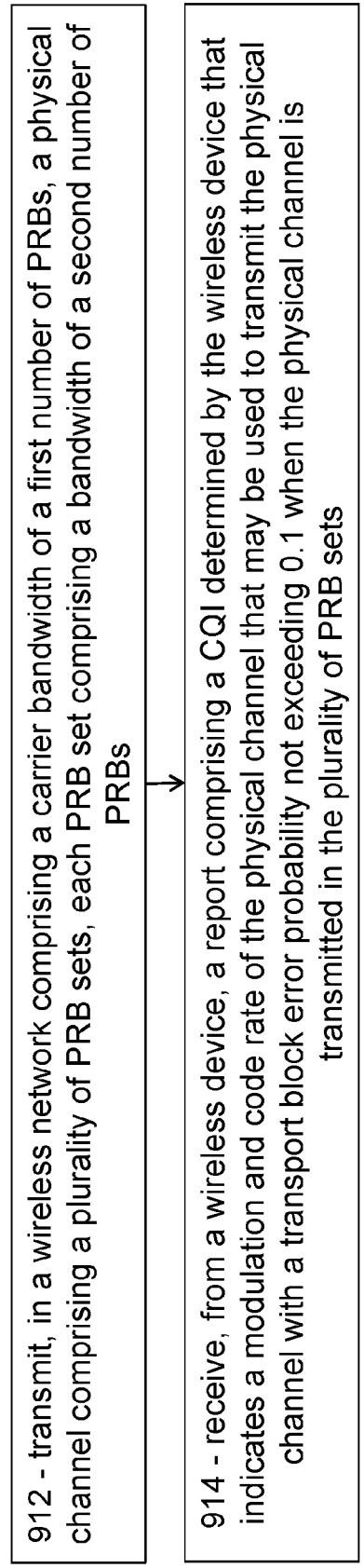
FIG. 9 is a flow diagram illustrating an example method in a network node of receiving a CQI with frequency hopping, according to some embodiments.

FIG. 9 is a flow diagram illustrating an example method in a network node of receiving a CQI with frequency hopping, according to some embodiments. In particular embodiments, one or more steps of FIG. 9 may be performed by network node 120 of wireless network 100 described with respect to FIG. 3.

At step 912, a network node operating in a wireless network comprising a carrier bandwidth of a first number of PRBs, transmits a physical channel comprising a plurality of PRB sets, each PRB set comprising with a bandwidth of a second number of PRBs. For example, network node 120 operating in wireless network 100 with a carrier bandwidth of 20 MHz transmits PDSCH 42 to wireless device 110. Network node 120 and wireless device 110 are configured to use frequency hopping across a plurality of PRB sets. The bandwidth of PDSCH 42 comprises three PRB sets (e.g., PDSCH 42a, 42b, and 42c), each with a bandwidth of six PRBs, which is less than the carrier bandwidth.

In particular embodiments, the network node may transmit, from a wireless device, an indication of particular PRBs that the plurality of PRB sets occupy in a subframe. For example, network node 120 may transmit signaling to wireless device 110 indicating the six particular PRBs for each PRB set (e.g., PDSCH 42a, 42b and 42c) that network node 120 will use to transmit PDSCH 42.

At step 914, the network node receives, from the wireless device, a report comprising a CQI determined by the wireless device that indicates a modulation and code rate of the physical channel that may be used to transmit the physical channel with a transport block error probability not exceeding 0.1 when the physical channel is transmitted in the plurality of PRB sets. For example, wireless device 110 may determine a CQI that indicates a modulation and code rate of PDSCH 42 so that network node 120 may transmit PDSCH 42 with a transport block error probability not exceeding 0.1 when it transmits PDSCH 42 in each of the six-PRB sets (e.g., PDSCH 42a, 42b and 42c).

In particular embodiments, the wireless device may determine the CQI based on any of the embodiments described above with respect to transmission modes and reporting modes. Any of the embodiments described above with respect to FIG. 8 may be extended to apply to the frequency hopping embodiments described with respect to FIG. 9.

The network node receives the report from the wireless device. For example, network node 120 receives CSI report 135 from wireless device 110. CSI report 135 includes the determined CQI and/or a PMI that indicates a selected precoding matrix. In particular embodiments, the network node may receive the CSI report based on any of the embodiments described above with respect to transmission modes and reporting modes.

Modifications, additions, or omissions may be made to method 900. Additionally, one or more steps in method 900 of FIG. 9 may be performed in parallel or in any suitable order. All or parts of method 900 may be repeated over time as necessary.

Figure 10B:
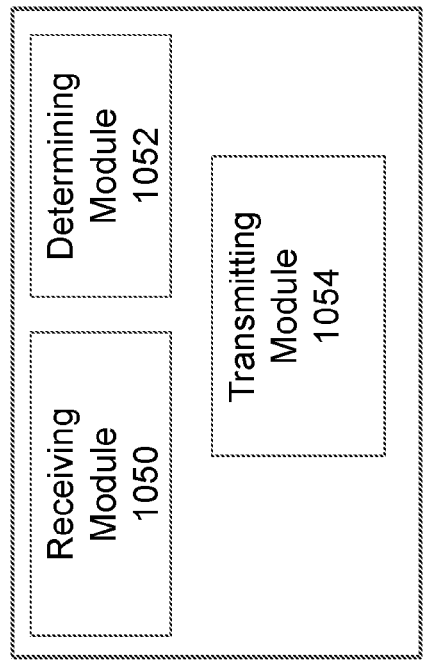
FIG. 10B is a block diagram illustrating example components of a wireless device.
Figure 10A:
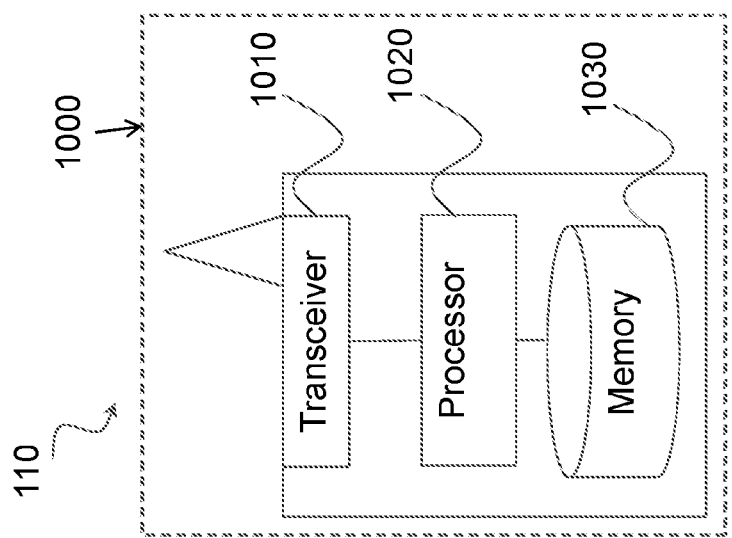
FIG. 10A is a block diagram illustrating an example embodiment of a wireless device.

FIG. 10A is a block diagram illustrating an example embodiment of a wireless device. The wireless device is an example of the wireless device 110 illustrated in FIG. 3.

The wireless device is capable of receiving a physical channel comprising a PRB set with a bandwidth of a number of PRBs that is less than the carrier bandwidth of the wireless network. The wireless device is operable to determine a CQI that indicates a modulation and code rate of the physical channel that may be used to transmit the physical channel with a transport block error probability not exceeding 0.1 when the physical channel is transmitted in the bandwidth of the PRB set in a subframe and at least part of the transport block is transmitted in the subframe. The wireless device is operable to transmit a report to a network node. The report comprises the determined CQI. In particular embodiments, the wireless device may receive, from the network node, an indication of the particular PRBs that the PRB set occupies in a subframe.

In particular embodiments, the wireless device is capable of selecting a precoding matrix that may be used to transmit the physical channel with a transport block error probability not exceeding 0.1 when the physical channel is transmitted, using the precoding matrix, in the bandwidth of the PRB set in a subframe and at least part of the transport block is transmitted in the subframe. The CQI report may comprise a PMI associated with the selected precoding matrix.

In particular embodiments, the wireless device is capable of receiving a physical channel comprising a plurality of PRB sets, each PRB set comprising a bandwidth of a particular number of PRBs which is less than the carrier bandwidth. The wireless device may determine a CQI that indicates a modulation and code rate of the physical channel that may be used to transmit the physical channel with a transport block error probability not exceeding 0.1 when the physical channel is transmitted in the plurality of PRB sets.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes processing circuitry 1000. Processing circuitry 1000 includes transceiver 1010, processor 1020, and memory 1030. In some embodiments, transceiver 1010 facilitates transmitting wireless signals to and receiving wireless signals from wireless network node 120 (e.g., via an antenna), processor 1020 executes instructions to provide some or all of the functionality described herein as provided by the wireless device, and memory 1030 stores the instructions executed by processor 1020.

Processor 1020 includes any suitable combination of hardware and software implemented in one or more integrated circuits or modules to execute instructions and manipulate data to perform some or all of the described functions of the wireless device. In some embodiments, processor 1020 may include, for example, one or more computers, one more programmable logic devices, one or more central processing units (CPUs), one or more microprocessors, one or more applications, and/or other logic, and/or any suitable combination of the preceding. Processor 1020 may include analog and/or digital circuitry configured to perform some or all of the described functions of wireless device 110. For example, processor 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1020 in communication with transceiver 1010 may receive a physical channel on a subset of PRBs and determine a CQI based on the received subset of PRBs.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

FIG. 10B is a block diagram illustrating example components of a wireless device 110. The components may include receiving module 1050, determining module 1052, and transmitting module 1054.

Receiving module 1050 may perform the receiving functions of wireless device 110. For example, receiving module 1050 may receive, in a wireless network comprising a carrier bandwidth of a first number of PRBs, one or more physical channels comprising a PRB set(s) with a bandwidth of a second number of PRBs, wherein the second number is less than the first number. In certain embodiments, receiving module 1050 may include or be included in processor 1020. Receiving module 1050 may include circuitry configured to receive radio signals. In particular embodiments, receiving module 1050 may communicate with determining module 1052 and transmitting module 1054.

Determining module 1052 may perform the determining functions of wireless device 110. For example, determining module 1052 may determine a CQI that indicates a modulation and code rate of the physical channel that may be used to transmit the physical channel with a transport block error probability not exceeding 0.1 when the physical channel is transmitted in the bandwidth of the PRB set(s) in a subframe and at least part of the transport block is transmitted in the subframe. In certain embodiments, determining module 1052 may include or be included in processor 1020. In particular embodiments, determining module 1052 may communicate with receiving module 1050 and transmitting module 1054.

Transmitting module 1054 may perform the transmitting functions of wireless device 110. For example, transmitting module 1054 may transmit a report, such as a CSI report that may include a CQI and/or PMI, to network node 120. In certain embodiments, transmitting module 1054 may include or be included in processor 1020. In particular embodiments, transmitting module 1054 may communicate with receiving module 1050 and determining module 1052.

FIG. 11A is a block diagram illustrating an example embodiment of a network node. The network node is an example of the network node 120 illustrated in FIG. 3. The network node is capable of transmitting, in a wireless network comprising a carrier bandwidth of a first number of physical resource blocks (PRBs), a physical channel comprising one or more PRB set(s) with a bandwidth of a second number of PRBs. The second number is less than the first number. The network node is capable of receiving a report, such as a CSI report, from a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes processing circuitry 1100. Processing circuitry 1100 includes at least one transceiver 1110, at least one processor 1120, at least one memory 1130, and at least one network interface 1140. Transceiver 1110 facilitates transmitting wireless signals to and receiving wireless signals from a wireless device, such as wireless devices 110 (e.g., via an antenna); processor 1120 executes instructions to provide some or all of the functionality described above as being provided by a network node 120; memory 1130 stores the instructions executed by processor 1120; and network interface 1140 communicates signals to backend network components, such as a gateway, switch, router, Internet, Public Switched Telephone Network (PSTN), controller, and/or other network nodes 120. Processor 1120 and memory 1130 can be of the same types as described with respect to processor 1020 and memory 1030 of FIG. 10A above.

In some embodiments, network interface 1140 is communicatively coupled to processor 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

In particular embodiments, processor 1120 in communication with transceiver 1110 transmits a physical channel comprising one or more PRB set(s) with a bandwidth less than the carrier bandwidth and receives a report, such as a CSI report, from a wireless device.

Other embodiments of network node 120 include additional components (beyond those shown in FIG. 11A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

FIG. 11B is a block diagram illustrating example components of a network node 120. The components may include transmitting module 1150 and receiving module 1152.

Transmitting module 1150 may perform the transmitting functions of network node 120. For example, transmitting module 1150 may transmit, in a wireless network comprising a carrier bandwidth of a first number of PRBs, one or more physical channels comprising a PRB set(s) with a bandwidth of a second number of PRBs, wherein the second number is less than the first number. In certain embodiments, transmitting module 1150 may include or be included in processor 1120. Transmitting module 1150 may include circuitry configured to transmit radio signals. In particular embodiments, transmitting module 1150 may communicate with receiving module 1152.

Receiving module 1152 may perform the receiving functions of network node 120. For example, receiving module 1152 may receive a report, such as a CSI report, from wireless device 110. In certain embodiments, receiving module 1152 may include or be included in processor 1120. Receiving module 1152 may include circuitry configured to receive radio signals. In particular embodiments, receiving module 1152 may communicate with transmitting module 1150.

Some embodiments of the disclosure may provide one or more technical advantages. As an example, particular embodiments define CSI reporting modes for low complexity, coverage enhanced MTC devices. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations Used in the Preceding Description Include:
3GPP Third Generation Partnership Project
BTS Base Transceiver Station
CCA Clear Channel Assessment
CFP Contention-Free Period
CQI Channel Quality Indicator
CSI Channel State Indicator
D2D Device to Device
DCF Distributed Coordination Function
DFT Discrete Fourier Transform
DIFS DCF Inter-frame Spacing
DL Downlink
DMRS Demodulation Reference Signal
DRS Discovery Reference Signal
eNB eNodeB
EPDCCH Enhanced Physical Downlink Control Channel
FDD Frequency Division Duplex
HARQ Hybrid Automatic Repeat Request
IoT Internet of Things
LAA Licensed Assisted Access
LBT Listen Before Talk
LTE Long Term Evolution
M2M Machine to Machine MIMO Multi-Input Multi-Output
MPDCCH MTC Physical Downlink Control Channel
MTC Machine Type Communication
OFDM Orthogonal Frequency Division Multiplexing
PCell Primary Cell
PCF Point Coordination Function
PDCCH Physical Downlink Control Channel
PDSCH Physical Downlink Shared Channel
PMI Precoding Matrix Indicator
PRB Physical Resource Block
PUCCH Physical Uplink Control Channel
PUSCH Physical Uplink Shared Channel
RAN Radio Access Network
RAT Radio Access Technology
RI Rank Indicator
RRH Remote Radio Head
RRU Remote Radio Unit
SCell Secondary Cell
SeNB Secondary eNodeB
SIFS Short Inter-frame Spacing
TDD Time division duplex
UE User Equipment
WAN Wireless Access Network

The invention claimed is:

1. A method in a wireless device of reporting a narrowband channel quality indicator (CQI), the method comprising:
receiving, in a wireless network comprising a carrier bandwidth of a first number of physical resource blocks (PRBs), a physical channel comprising a plurality of narrowband PRB sets, each narrowband PRB set of the plurality of narrowband PRB sets comprising a bandwidth of a second number of PRBs, wherein the bandwidth of the second number of PRBs is less than the bandwidth of the first number of PRBs, and wherein each narrowband PRB set of the plurality of narrowband PRB sets comprises different time and frequency resources than the other narrowband PRB sets of the plurality of narrowband PRB sets and receiving the physical channel comprises receiving the physical channel via frequency hopping between the plurality of narrowband PRB sets;
determining a CQI that indicates a modulation and code rate of the physical channel that may be used to transmit the physical channel with a transport block error probability not exceeding 0.1 when the physical channel is transmitted in the plurality of narrowband PRB sets in a subframe and at least part of the transport block is transmitted in the subframe; and
transmitting a report to a network node, the report comprising the determined CQI for frequency hopping between the plurality of narrowband PRB sets and wherein the report is formatted according to one of a long term evolution (LTE) transmission mode 1, 2 and 6 reporting format.

2. The method of claim 1, further comprising receiving, from the network node, an indication of particular PRBs that the plurality of narrowband PRB sets occupy in a subframe.

3. The method of claim 1, wherein the report comprises a wideband CQI value, the wideband CQI value determined based on transmission on all PRBs in the plurality of narrowband PRB sets.

4. The method of claim 1, wherein determining the CQI further comprises selecting a precoding matrix that may be used to transmit the physical channel with a transport block error probability not exceeding 0.1 when the physical channel is transmitted, using the precoding matrix, in the plurality of narrowband PRB sets; and
the report comprises a precoding matrix indicator (PMI) associated with the selected precoding matrix.

5. The method of claim 1, wherein the second number of PRBs is less than or equal to six PRBs.

6. The method of claim 1, wherein the wireless device is operating in Coverage Enhancement Mode A (CEModeA).

7. The method of claim 1, wherein the wireless device is a machine type communication (MTC) wireless device.

8. The method of claim 1, wherein the wireless device is a user equipment (UE).

9. A method in a network node of receiving a narrowband channel quality indicator (CQI) report, the method comprising:
transmitting, in a wireless network comprising a carrier bandwidth of a first number of physical resource blocks (PRBs), a physical channel comprising a plurality of narrowband PRB sets, each narrowband PRB set of the plurality of narrowband PRB sets comprising a bandwidth of a second number of PRBs, wherein the bandwidth of the second number of PRBs is less than the bandwidth of the first number of PRBs, and wherein each narrowband PRB set of the plurality of narrowband PRB sets comprises different time and frequency resources than the other narrowband PRB sets of the plurality of narrowband PRB sets and transmitting the physical channel comprises transmitting the physical channel via frequency hopping between the plurality of narrowband PRB sets; and
receiving, from a wireless device, a report comprising a CQI determined by the wireless device that indicates a modulation and code rate of the physical channel that may be used to transmit the physical channel with a transport block error probability not exceeding 0.1 when the physical channel is transmitted in the plurality of narrowband PRB sets in a subframe and at least part of the transport block is transmitted in the subframe, wherein the report is formatted according to one of a long term evolution (LTE) transmission mode 1, 2 and 6 reporting format.

10. The method of claim 9, further comprising transmitting, to the wireless device, an indication of particular PRBs that the plurality of narrowband PRB sets occupy in a subframe.

11. The method of claim 9, wherein the report comprises a wideband CQI value, the wideband CQI value determined based on transmission on all PRBs in the plurality of narrowband PRB sets.

12. The method of claim 9, wherein the received report further comprises a precoding matrix indicator associated with a precoding matrix selected by the wireless device that may be used to transmit the physical channel with a transport block error probability not exceeding 0.1 when the physical channel is transmitted, using the precoding matrix, in the plurality of narrowband PRB sets.

13. The method of claim 9, wherein the second number of PRBs is less than or equal to six PRBs.

14. The method of claim 9, wherein the wireless device is operating in Coverage Enhancement Mode A (CEModeA).

15. The method of claim 9, wherein the wireless device is a machine type communication (MTC) wireless device.

16. The method of claim 9, wherein the wireless device is a user equipment (UE).

17. A wireless device comprising processing circuitry operable to:

receive, in a wireless network comprising a carrier bandwidth of a first number of physical resource blocks (PRBs), a physical channel comprising a plurality of narrowband PRB sets, each narrowband PRB set of the plurality of narrowband PRB sets comprising a bandwidth of a second number of PRBs, wherein the bandwidth of the second number of PRBs is less than the bandwidth of the first number of PRBs, and wherein each narrowband PRB set of the plurality of narrowband PRB sets comprises different time and frequency resources than the other narrowband PRB sets of the plurality of narrowband PRB sets and the processing circuitry is operable to receive the physical channel by frequency hopping between the plurality of narrowband PRB sets;

determine a narrowband CQI that indicates a modulation and code rate of the physical channel that may be used to transmit the physical channel with a transport block error probability not exceeding 0.1 when the physical channel is transmitted in the plurality of narrowband PRB sets in a subframe and at least part of the transport block is transmitted in the subframe; and transmit a report to a network node, the report comprising the determined narrowband CQI for frequency hopping between the plurality of narrowband PRB sets and wherein the report is formatted according to one of a long term evolution (LTE) transmission mode 1, 2 and 6 reporting format.

18. The wireless device of claim 17, the processing circuitry further operable to receive, from the network node, an indication of particular PRBs that plurality of narrowband PRB sets occupy in a subframe.

19. The wireless device of claim 17, wherein the report comprises a wideband CQI value, the wideband CQI value determined based on transmission on all PRBs in the plurality of narrowband PRB sets.

20. The wireless device of claim 17, wherein the processing circuitry determines the CQI by selecting a precoding matrix that may be used to transmit the physical channel with a transport block error probability not exceeding 0.1 when the physical channel is transmitted, using the precoding matrix, in the plurality of narrowband PRB sets; and the report comprises a precoding matrix indicator (PMI) associated with the selected precoding matrix.

21. The wireless device of claim 17, wherein the second number of PRBs is less than or equal to six PRBs.

22. The wireless device of claim 17, wherein the wireless device is operating in Coverage Enhancement Mode A (CEModeA).

23. The wireless device of claim 17, wherein the wireless device is a machine type communication (MTC) wireless device.

24. The wireless device of claim 17, wherein the wireless device is a user equipment (UE).

25. A network node comprising processing circuitry operable to:

transmit, in a wireless network comprising a carrier bandwidth of a first number of physical resource blocks (PRBs), a physical channel comprising a plurality of narrowband PRB sets, each narrowband PRB set of the plurality of narrowband PRB sets comprising a bandwidth of a second number of PRBs, wherein the bandwidth of the second number of PRBs is less than the bandwidth of the first number of PRBs, and wherein each narrowband PRB set of the plurality of narrowband PRB sets comprises different time and frequency resources than the other narrowband PRB sets of the plurality of narrowband PRB sets and the processing circuitry is operable to transmit the physical channel by via frequency hopping between the plurality of narrowband PRB sets; and receive, from a wireless device, a report comprising a narrowband CQI determined by the wireless device that indicates a modulation and code rate of the physical channel that may be used to transmit the physical channel with a transport block error probability not exceeding 0.1 when the physical channel is transmitted in the plurality of narrowband PRB sets in a subframe and at least part of the transport block is transmitted in the subframe, wherein the report is formatted according to one of a long term evolution (LTE) transmission mode 1, 2 and 6 reporting format.

26. The network node of claim 25, the processing circuitry further operable to transmit, to the wireless device, an indication of particular PRBs that the plurality of narrowband PRB sets occupy in a subframe.

27. The network node of claim 25, wherein the report comprises a wideband CQI value, the wideband CQI value determined based on transmission on all PRBs in the plurality of narrowband PRB sets.

28. The network node of claim 25, wherein the received report further comprises a precoding matrix indicator associated with a precoding matrix selected by the wireless device that may be used to transmit the physical channel with a transport block error probability not exceeding 0.1 when the physical channel is transmitted, using the precoding matrix, in the plurality of narrowband PRB sets.

29. The network node of claim 25, wherein the second number of PRBs is less than or equal to six PRBs.

30. The network node of claim 25, wherein the wireless device is operating in Coverage Enhancement Mode A (CEModeA).

31. The network node of claim 25, wherein the wireless device is a machine type communication (MTC) wireless device.

32. The network node of claim 25, wherein the wireless device is a user equipment (UE).

* * * * *